（12) United States Patent
Kakiage et al.

(10) Patent No.: US 12,537,187 B2
(45) Date of Patent: Jan. 27, 2026

(54) ELECTRODE AND LITHIUM ION SECONDARY BATTERY

(71) Applicant: ADEKA CORPORATION, Tokyo (JP)

(72) Inventors: Kenji Kakiage, Tokyo (JP); Marie Kaneko, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 539 days.

(21) Appl. No.: 18/009,471

(22) PCT Filed: Jun. 2, 2021

(86) PCT No.: PCT/JP2021/020975
§ 371 (c)(1),
(2) Date: Dec. 9, 2022

(87) PCT Pub. No.: WO2021/251234
PCT Pub. Date: Dec. 16, 2021

(65) Prior Publication Data
US 2023/0238511 A1 Jul. 27, 2023

(30) Foreign Application Priority Data
Jun. 12, 2020 (JP) .................................. 2020-102128

(51) Int. Cl.
*H01M 4/36* (2006.01)
*H01M 4/02* (2006.01)
(Continued)

(52) U.S. Cl.
CPC ......... *H01M 4/364* (2013.01); *H01M 4/0404* (2013.01); *H01M 4/485* (2013.01);
(Continued)

(58) Field of Classification Search
None
See application file for complete search history.

(56) References Cited

U.S. PATENT DOCUMENTS

2005/0221188 A1   10/2005   Takami et al.
2008/0032192 A1*   2/2008   Yokomizo ............. H01M 4/133
                                                                  429/210
(Continued)

FOREIGN PATENT DOCUMENTS

CN   101453038   6/2009
JP   3769291   4/2006
(Continued)

OTHER PUBLICATIONS

International Search Report (ISR) issued Aug. 31, 2021 in International (PCT) Application No. PCT/JP2021/020975.
(Continued)

*Primary Examiner* — Kevin M Bernatz
(74) *Attorney, Agent, or Firm* — WENDEROTH, LIND & PONACK, L.L.P.

(57) ABSTRACT

Provided is an electrode, including: a collector; and an active material layer formed on the collector, wherein the active material layer contains sulfur-modified polyacrylonitrile and a lithium-titanium oxide, wherein an average secondary particle diameter of the sulfur-modified polyacrylonitrile is larger than an average secondary particle diameter of the lithium-titanium oxide, and wherein a content of the sulfur-modified polyacrylonitrile in the active material layer is from 5 mass % to 85 mass %, and a content of the lithium-titanium oxide in the active material layer is from 5 mass % to 85 mass %.

6 Claims, 5 Drawing Sheets

(51) Int. Cl.
  *H01M 4/04* (2006.01)
  *H01M 4/485* (2010.01)
  *H01M 4/60* (2006.01)
  *H01M 10/0525* (2010.01)
  *H01M 10/0562* (2010.01)
  *H01M 10/0568* (2010.01)
  *H01M 10/0569* (2010.01)

(52) U.S. Cl.
  CPC ....... *H01M 4/604* (2013.01); *H01M 10/0525* (2013.01); *H01M 10/0562* (2013.01); *H01M 10/0568* (2013.01); *H01M 10/0569* (2013.01); *H01M 2004/021* (2013.01); *H01M 2300/0037* (2013.01); *H01M 2300/0051* (2013.01); *H01M 2300/0071* (2013.01)

(56) References Cited

U.S. PATENT DOCUMENTS

| | | |
|---|---|---|
| 2011/0200875 A1 | 8/2011 | Miyuki et al. |
| 2012/0052399 A1 | 3/2012 | Takami et al. |
| 2014/0065469 A1 | 3/2014 | Takami et al. |
| 2014/0106226 A1* | 4/2014 | Hayashi ................ C01G 49/06 429/221 |
| 2018/0006299 A1 | 1/2018 | Daigle et al. |
| 2020/0176807 A1* | 6/2020 | Nishio ................ H01M 10/052 |
| 2020/0295368 A1* | 9/2020 | Kong .................... C01G 53/50 |
| 2020/0313169 A1 | 10/2020 | Daigle et al. |
| 2022/0371906 A1* | 11/2022 | Narita .................... C01D 15/02 |
| 2024/0145765 A1* | 5/2024 | Mukai .................. H01M 4/366 |

FOREIGN PATENT DOCUMENTS

| | | | |
|---|---|---|---|
| JP | 2019-521488 | 7/2019 | |
| WO | 2010/044437 | 4/2010 | |
| WO | WO-2014082296 A1 * | 6/2014 | ............. H01M 4/38 |
| WO | 2018/000099 | 1/2018 | |
| WO | 2019/225588 | 11/2019 | |
| WO | 2020/045561 | 3/2020 | |

OTHER PUBLICATIONS

Extended European Search report issued Jun. 23, 2025 in corresponding European Patent Application No. 21822348.5.

* cited by examiner

FIG. 5

ELECTRODE AND LITHIUM ION SECONDARY BATTERY

TECHNICAL FIELD

The present invention relates to an electrode including sulfur-modified polyacrylonitrile and a lithium-titanium oxide as its electrode active materials, and to a lithium ion secondary battery including the electrode.

BACKGROUND ART

A lithium ion secondary battery has a higher cell voltage and a higher energy density than those of a related-art nickel-hydrogen secondary battery. Accordingly, the application of the battery to a hybrid automobile and an electric automobile, a stationary storage battery, and an electronic device such as a laptop personal computer as well as to a mobile device such as a smartphone has been advanced. However, the application involves problems, such as an increase in capacity of the battery, an increase in output thereof, the lengthening of the life thereof, an improvement in safety thereof, and a reduction in cost thereof, and hence the development of an electrode material, an electrolytic solution, and a separator has been vigorously performed.

In, for example, Patent Document 1, there is a proposal of a lithium ion secondary battery in which at least one kind selected from the group consisting of: a lithium-nickel-cobalt-manganese composite oxide; a spinel-type lithium-manganese-nickel composite oxide; a lithium-phosphorus oxide having an olivine structure; a lithium-cobalt oxide; a lithium-nickel-cobalt composite oxide; and a lithium-manganese composite oxide is used as a positive electrode, and a lithium-titanium oxide is used as a negative electrode.

In addition, in Patent Document 2, there is a disclosure of a lithium ion secondary battery in which lithium iron phosphate is used as a positive electrode, and a carbon-coated LTO electrode (electrode using particles, which are obtained by subjecting an acrylonitrile monomer to emulsion polymerization to form polyacrylonitrile on the surfaces of, and in, lithium-titanium oxide particles, and performing carbonization treatment to coat the surfaces of the lithium-titanium oxide particles with carbon) is used as a negative electrode.

In Patent Document 3, there is a disclosure of a lithium ion secondary battery in which sulfur-modified polyacrylonitrile is used as a positive electrode and metal lithium foil is used as a negative electrode.

CITATION LIST

Patent Document

Patent Document 1: JP 3769291 B2
Patent Document 2: JP 2019-521488 A
Patent Document 3: WO 2010/044437 A1

SUMMARY OF INVENTION

Technical Problem

A related-art lithium ion secondary battery has involved a problem in that the performance of its high-speed charge and discharge reduces its electric capacity that can be charged and discharged. Accordingly, an object of the present invention is to provide an electrode, which provides a high electric capacity at the time of high-speed charge and discharge, and is excellent in high-temperature stability. Another object of the present invention is to provide a lithium ion secondary battery including the electrode as a positive electrode or a negative electrode.

Solution to Problem

The present inventors have carried out extensive investigations and found that the above-mentioned problem can be solved by using an active material layer containing, at specific ratios, sulfur-modified polyacrylonitrile and a lithium-titanium oxide having average secondary particle diameters satisfying a specific relationship. Thus, the inventors have completed the present invention.

That is, according to one embodiment of the present invention, there is provided an electrode, including: a collector; and an active material layer formed on the collector, wherein the active material layer contains sulfur-modified polyacrylonitrile and a lithium-titanium oxide, wherein an average secondary particle diameter of the sulfur-modified polyacrylonitrile is larger than an average secondary particle diameter of the lithium-titanium oxide, and wherein a content of the sulfur-modified polyacrylonitrile in the active material layer is from 5 mass % to 85 mass %, and a content of the lithium-titanium oxide in the active material layer is from 5 mass % to 85 mass %.

In the electrode according to the embodiment of the present invention, it is preferred that the average secondary particle diameter of the sulfur-modified polyacrylonitrile be from 0.1 μm to 50 μm.

In the electrode according to the embodiment of the present invention, it is preferred that the average secondary particle diameter of the lithium-titanium oxide be from 0.05 μm to 30 μm.

According to another embodiment of the present invention, there is provided a lithium ion secondary battery, including: a positive electrode; a negative electrode; and a lithium salt-containing nonaqueous electrolyte, wherein the positive electrode or the negative electrode is the above-mentioned electrode.

In the lithium ion secondary battery according to the embodiment of the present invention, it is preferred that the lithium salt-containing nonaqueous electrolyte be a liquid nonaqueous electrolyte, a polymer gel-like nonaqueous electrolyte, a polymer nonaqueous electrolyte, a complex hydride-based solid electrolyte, or an inorganic solid electrolyte.

In the lithium ion secondary battery according to the embodiment of the present invention, it is preferred that the lithium salt-containing nonaqueous electrolyte be a liquid nonaqueous electrolyte, and the liquid nonaqueous electrolyte contain a cyclic carbonate compound.

In the lithium ion secondary battery according to the embodiment of the present invention, it is more preferred that the liquid nonaqueous electrolyte further contain a chain carbonate compound.

In the lithium ion secondary battery according to the embodiment of the present invention, it is preferred that the lithium salt-containing nonaqueous electrolyte be an inorganic solid electrolyte, and the inorganic solid electrolyte be a sulfide-based solid electrolyte or an oxide-based solid electrolyte.

Advantageous Effects of Invention

According to the present invention, the lithium ion secondary battery, which provides a high electric capacity at the time of high-speed charge and discharge, and is excellent in high-temperature stability, can be provided.

DESCRIPTION OF EMBODIMENTS

An electrode and a lithium ion secondary battery of the present invention are described in detail below on the basis of preferred embodiments.

The electrode of the present invention is characterized in that an active material layer containing sulfur-modified polyacrylonitrile and a lithium-titanium oxide is formed on a collector.

<Sulfur-Modified Polyacrylonitrile>

The sulfur-modified polyacrylonitrile (hereinafter sometimes referred to as "SPAN") may be produced by: mixing a polyacrylonitrile compound and sulfur; and subjecting the mixture to heating treatment in a nonoxidizing atmosphere at from 250° C. to 600° C. to modify the compound. The nonoxidizing atmosphere refers to an atmosphere, which has an oxygen concentration of less than 5 vol %, preferably less than 2 vol %, and is more preferably substantially free of oxygen, and examples thereof include: an inert gas atmosphere, such as nitrogen, helium, or argon; and a sulfur gas atmosphere.

In addition, the SPAN may be produced after any other active material or a conductive aid has been added at the time of the mixing of the polyacrylonitrile compound and sulfur.

The polyacrylonitrile compound may be a homopolymer of acrylonitrile, or may be a copolymer of acrylonitrile and any other monomer. The content of acrylonitrile in the copolymer of acrylonitrile and the other monomer is preferably at least 90 mass %, and the polyacrylonitrile compound is more preferably a polyacrylonitrile homopolymer from the following viewpoint: as the content of acrylonitrile in the polyacrylonitrile compound becomes lower, an increase in capacity of a battery including the electrode through use of the active material cannot be achieved, and hence the performance of the battery reduces. Examples of the other monomer include acrylic acid, vinyl acetate, N-vinylformamide, and N,N'-methylenebis(acrylamide).

The SPAN is preferably formed into a desired particle diameter by a method, such as pulverization or granulation. The pulverization may be dry pulverization to be performed in a gas, or may be wet pulverization to be performed in a liquid such as water. An industrial pulverization method is, for example, a ball mill, a roller mill, a turbo mill, a jet mill, a cyclone mill, a hammer mill, a pin mill, a rotary mill, a vibration mill, a planetary mill, an attritor, or a bead mill.

The pulverized SPAN is preferably further classified. Although a method for the classification is not particularly limited, such classification methods as described below may each be adopted: a dry classification method, such as gravity classification, inertial classification, or centrifugal classification; a wet classification method, such as sedimentation classification, mechanical classification, or hydraulic classification; and a sieving classification method including using a sieving screen, such as a vibrating sieve or an in-plane motion sieve. Of those, a sieving classification method is preferred.

The performance of the pulverizing and classifying steps enables efficient production of the SPAN having a particle diameter suitable for the electrode of the present invention.

The SPAN containing only primary particles, the SPAN containing only secondary particles each of which is an aggregate of the primary particles, or the SPAN containing both of the primary particles and the secondary particles may be used. The average secondary particle diameter (D50) of the SPAN is preferably 50 µm or less, more preferably 30 µm or less, even more preferably 20 µm or less. Meanwhile, when the average secondary particle diameter of the SPAN is excessively small, a side reaction is liable to occur along with the deterioration of its handleability or an increase in specific surface area of its particles, and the side reaction adversely affects the charge-discharge stability of the lithium ion secondary battery of the present invention. Accordingly, the average secondary particle diameter (D50) of the SPAN is preferably 0.1 µm or more, more preferably 0.5 µm or more, even more preferably 1 µm or more.

The average secondary particle diameter of the SPAN is a 50% particle diameter measured by a laser diffraction light scattering method. In the laser diffraction light scattering method, a particle diameter is a diameter on a volume basis, and the secondary particle diameters of the SPAN are measured. When the average secondary particle diameter of the SPAN is measured by the laser diffraction light scattering method, the measurement is performed after the SPAN has been dispersed in a dispersion medium, such as water or an alcohol.

In the present invention, the shape of the SPAN may be a fibrous shape. When fibrous SPAN is used, a preferred average fiber diameter is 0.05 µm or more and 10 µm or less. Although the fiber diameter of the SPAN is preferably as small as possible, with regard to polyacrylonitrile serving as a raw material for the SPAN, an industrial product of polyacrylonitrile having an average fiber diameter of less than 0.05 µm is hardly available. In addition, when the average fiber diameter of the fibrous SPAN is more than 10 µm, a large charge-discharge capacity may not be obtained. The average fiber diameter of the fibrous SPAN is preferably from 0.1 µm to 5 µm, more preferably from 0.15 µm to 2 µm from the viewpoint of obtaining a larger charge-discharge capacity, and from the viewpoint of making the SPAN easily available.

When the aspect ratio of the fibrous SPAN is represented by the ratio of its fiber length to its fiber diameter, the average aspect ratio of the fibrous SPAN is preferably 3 or more, more preferably 5 or more. As the aspect ratio becomes larger, a larger charge-discharge capacity is obtained. Accordingly, the fiber length is preferably as large as possible. However, when the fiber length is excessively large, the surface of the active material layer containing the SPAN may not be smooth. The average fiber length of the fibrous SPAN is preferably 300 µm or less, more preferably 150 µm or less. From the same viewpoint, the average aspect ratio of the fibrous SPAN is preferably 5,000 or less, more preferably 1,000 or less. The fiber length and fiber diameter of the fibrous SPAN may be determined from a scanning electron microscope image (SEM image) thereof. The fiber length represents the length of a fiber. When a section orthogonal to the lengthwise direction of the fiber is a circular shape, the fiber diameter represents the diameter of the circle, and when the section is not a circular shape, the diameter represents the average of the short diameter and long diameter of the section. Fiber diameters in one fiber of the fibrous SPAN may be measured at arbitrary sites.

The average aspect ratio of the fibrous SPAN is a value obtained by calculating the ratio of the average fiber length to the average fiber diameter, and the average fiber length and the average fiber diameter represent values obtained by arithmetically averaging fiber lengths and fiber diameters measured from a SEM image of 10 or more fibers of the fibrous SPAN, respectively.

A sulfur content in the SPAN is preferably from 30 mass % to 45 mass %, more preferably from 35 mass % to 43 mass % because a large charge-discharge capacity, and an excellent cycle characteristic are obtained.

Herein, the sulfur content of the SPAN represents a numerical value calculated from the result of elemental analysis with a CHN analyzer, which can analyze sulfur and oxygen, such as a vario MICRO cube manufactured by Elementar.

In the active material layer containing the SPAN and the lithium-titanium oxide, the content of the SPAN falls within the range of from 5 mass % to 85 mass %, and preferably falls within the range of from 10 mass % to 80 mass %. When the content of the SPAN is more than 85 mass %, the rate characteristic of the lithium ion secondary battery remarkably reduces. Meanwhile, when the content of the SPAN is less than 5 mass %, the discharge capacity of the lithium ion secondary battery at the time of its high-speed charge reduces.

<Lithium-Titanium Oxide>

The lithium-titanium oxide is, for example, a compound represented by the following general formula (1):

$$Li_aTi_bO_cM_d \quad (1)$$

where M represents one kind, or a mixture of two or more kinds, selected from the group consisting of: Zr; B; Sn; S; Be; Ge; and Zn, and "a", "b", "c", and "d" satisfy 0.5≤a≤5, 1≤b≤5, 2≤c≤12, and 0≤d<0.1, respectively.

Examples of the lithium-titanium oxide suitable for the electrode of the present invention include a spinel-structure lithium-titanium oxide and a ramsdellite-structure lithium-titanium oxide. The spinel-structure lithium-titanium oxide is, for example, $Li_{4+e}Ti_5O_{12}$. The ramsdellite-structure lithium-titanium oxide is, for example, $Li_{2+e}Ti_3O_7$, $Li_{1+f}Ti_2O_4$, $Li_{1.1+f}Ti_{1.8}O_4$, or $Li_{1.07+f}Ti_{1.86}O_4$. "e" and "f" satisfy −1≤e≤1 and 0≤f≤1, respectively.

In the electrode of the present invention, the spinel-structure lithium-titanium oxide is preferred because a change in volume of the lithium ion secondary battery at the time of its charge is small.

A lithium-titanium oxide containing only primary particles, a lithium-titanium oxide containing only secondary particles each of which is an aggregate of the primary particles, or a lithium-titanium oxide containing both of the primary particles and the secondary particles may be used as the lithium-titanium oxide.

The average primary particle diameter (D50) of the lithium-titanium oxide is preferably 0.01 µm or more and 10 µm or less, more preferably 0.05 µm or more and 1 µm or less. A lithium-titanium oxide having an average primary particle diameter of less than 0.01 µm is difficult to produce. Meanwhile, when the average primary particle diameter of the lithium-titanium oxide is more than 10 µm, the unevenness of the surface of the electrode becomes larger to reduce the surface area thereof, and hence the affinity of the electrode for a nonaqueous electrolyte reduces to shorten the discharge cycle life of the lithium ion secondary battery in some cases.

The average primary particle diameter of the lithium-titanium oxide represents a value obtained by arithmetically averaging the long diameters of 10 or more particles of the lithium-titanium oxide measured from a SEM image thereof.

The average secondary particle diameter (D50) of the lithium-titanium oxide is preferably 0.05 µm or more and 30 µm or less, more preferably 0.5 µm or more and 10 µm or less. When the average secondary particle diameter of the lithium-titanium oxide is less than 0.05 µm, the oxide is difficult to handle and requires a large amount of a binder. In addition, the aggregation of the primary particles of the oxide becomes remarkable, and hence the affinity between the electrode and the nonaqueous electrolyte reduces to increase the resistance of the interface of the electrode with the electrolyte. Accordingly, the output characteristic and charge-discharge cycle characteristic of the lithium ion secondary battery may reduce. Meanwhile, when the average secondary particle diameter of the lithium-titanium oxide is more than 30 µm, the diffusion resistance of the oxide may increase to adversely affect the output characteristic and the charge-discharge cycle characteristic.

However, in the active material layer in the electrode of the present invention, the SPAN and the lithium-titanium oxide need to be selected so that the average secondary particle diameter of the SPAN may be larger than the average secondary particle diameter of the lithium-titanium oxide. When the average secondary particle diameter of the SPAN is equal to or less than the average secondary particle diameter of the lithium-titanium oxide, it becomes difficult to charge and discharge the battery at a high speed.

The average secondary particle diameter of the lithium-titanium oxide may be adjusted by, for example, subjecting the oxide to pulverization treatment with a pulverizer, such as a ball mill or a jet mill, granulation treatment, or classification treatment through sieving or the like.

The average secondary particle diameter (D50) of the lithium-titanium oxide is a 50% particle diameter measured by a laser diffraction light scattering method. In the laser diffraction light scattering method, a particle diameter is a diameter on a volume basis. When the average secondary particle diameter of the lithium-titanium oxide is measured by the laser diffraction light scattering method, the measurement is performed after the lithium-titanium oxide has been dispersed in a dispersion medium, such as water or an alcohol.

The specific surface area of the lithium-titanium oxide preferably falls within the range of from 1 m²/g to 200 m²/g, and more preferably falls within the range of from 3 m²/g to 50 m²/g. When the specific surface area of the lithium-titanium oxide is less than 1 m²/g, the incorporation of a lithium ion into the active material layer may be insufficient. Meanwhile, when the specific surface area of the lithium-titanium oxide is more than 200 m$^2$/g, the distribution of the nonaqueous electrolyte may be biased to adversely affect the output characteristic and cycle characteristic of the lithium ion secondary battery.

In the electrode of the present invention, when a product obtained by coating at least part of the surface of the lithium-titanium oxide with a carbon material is used, the resistance of the electrode can be reduced. Accordingly, the lithium-titanium oxide may be coated with the carbon material. A method of producing the lithium-titanium oxide coated with the carbon material is, for example, a method including: mixing the lithium-titanium oxide, a precursor of the carbon material, and a dispersion medium such as water; and calcining the mixture under an inert atmosphere at 500° C. or more.

In the active material layer containing the SPAN and the lithium-titanium oxide, the content of the lithium-titanium oxide falls within the range of from 5 mass % to 85 mass %, and preferably falls within the range of from 10 mass % to 80 mass %. When the content of the lithium-titanium oxide is less than 5 mass %, the rate characteristic of the lithium ion secondary battery remarkably reduces. Meanwhile, when the content of the lithium-titanium oxide is more than 85 mass %, the discharge capacity of the lithium ion secondary battery at the time of its high-speed charge reduces.

A lithium ion secondary battery including a liquid nonaqueous electrolyte or a polymer gel-like nonaqueous electrolyte as a lithium salt-containing nonaqueous electrolyte is a liquid battery. An active material layer in the electrode of the liquid battery represents an electrode mixture layer obtained by: applying an electrode mixture paste containing an active material, a binder, and a conductive aid onto a collector to form a coating film; and volatizing a volatile component such as a solvent from the coating film.

A lithium ion secondary battery including a polymer nonaqueous electrolyte, a complex hydride-based solid electrolyte, or an inorganic solid electrolyte as a lithium salt-containing nonaqueous electrolyte is a solid battery. An active material layer in the electrode of the solid battery may contain such nonaqueous electrolyte. In the present invention, the solid battery encompasses an all-solid battery and a semisolid battery.

The total amount of the SPAN and the lithium-titanium oxide in the active material layer in the electrode of the liquid battery is preferably 55 mass % or more, more preferably 70 mass % or more with respect to the active material layer from the viewpoint of sufficiently exhibiting the performance of the battery.

The total amount of the SPAN and the lithium-titanium oxide in the active material layer in the electrode of the solid battery is preferably 40 mass % or more, more preferably 70 mass % or more with respect to the active material layer from the viewpoint of sufficiently exhibiting the performance of the battery.

<Method of Producing Electrode>

The electrode of the present invention may be produced in conformity with a known method. The electrode including the active material layer formed on the collector may be produced by, for example, turning a blend, which contains active materials including the SPAN and the lithium-titanium oxide, a binder, and a conductive aid, into slurry with an organic solvent or water to produce an electrode mixture paste, applying the electrode mixture paste onto the collector, and drying the paste.

The binder is not particularly limited, and a known binder may be used. Specific examples of the binder include a styrene-butadiene rubber, a butadiene rubber, an acrylonitrile-butadiene rubber, an ethylene-propylene-diene rubber, a styrene-isoprene rubber, a fluorine rubber, polyethylene, polypropylene, polyacrylamide, polyamide, polyamide-imide, polyimide, polyacrylonitrile, polyurethane, polyvinylidene fluoride, polytetrafluoroethylene, a styrene-acrylic acid ester copolymer, an ethylene-vinyl alcohol copolymer, polymethyl methacrylate, polyacrylate, polyvinyl alcohol, polyethylene oxide, polyvinylpyrrolidone, polyvinyl ether, polyvinyl chloride, acrylic acid, polyacrylic acid, methylcellulose, carboxymethylcellulose, sodium carboxymethylcellulose, a cellulose nanofiber, and starch. The binders may be used alone or in combination thereof.

The content of the binder is preferably from 0.5 part by mass to 30 parts by mass with respect to 100 parts by mass of the active materials including the SPAN and the lithium-titanium oxide, and is more preferably from 1 part by mass to 20 parts by mass from the viewpoint that the stability of a working electrode becomes satisfactory.

A conductive aid known as a conductive aid for an electrode may be used as the conductive aid. Specific examples of the conductive aid include: carbon materials, such as natural graphite, artificial graphite, coal tar pitch, carbon black, acetylene black, ketjen black, channel black, furnace black, lamp black, thermal black, roller black, disc black, a carbon nanotube, a vapor grown carbon fiber (VGCF), flake graphite, graphene, fullerene, and needle coke; metal powders, such as aluminum powder, nickel powder, and titanium powder; conductive metal oxides, such as zinc oxide and titanium oxide; and sulfides, such as $La_2S_3$, $Sm_2S_3$, $Ce_2S_3$, and $TiS_2$.

The average primary particle diameter of the conductive aid is preferably from 0.0001 μm to 100 μm, more preferably from 0.001 μm to 50 μm.

The content of the conductive aid is typically from 0.1 part by mass to 50 parts by mass, preferably from 0.5 part by mass to 30 parts by mass, more preferably from 1 part by mass to 20 parts by mass with respect to 100 parts by mass of the active materials including the SPAN and the lithium-titanium oxide.

Examples of the organic solvent include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N-methylpyrrolidone, N,N-dimethylformamide, dimethylacetamide, methyl ethyl ketone, cyclohexanone, methyl acetate, methyl acrylate, diethyltriamine, N,N-dimethylaminopropylamine, polyethylene oxide, tetrahydrofuran, dimethyl sulfoxide, sulfolane, γ-butyrolactone, and an alcohol. The usage amount of the organic solvent or the water may be adjusted in accordance with an application method to be selected at the time of the application of the electrode mixture paste. In the case of, for example, application by a doctor blade method, the content is preferably from 10 parts by mass to 300 parts by mass, more preferably from 20 parts by mass to 200 parts by mass with respect to 100 parts by mass of the total amount of the active materials, the binder, and the conductive aid.

In the production of the electrode mixture paste, any other component, such as a viscosity adjuster, a reinforcing material, an antioxidant, a pH adjuster, or a dispersant, may be incorporated into the electrode mixture paste to the extent that the effect of the present invention is not impaired. A known component may be used as such other component at a known blending ratio.

In the production of the electrode mixture paste, at the time of the dispersion or dissolution of the SPAN and the lithium-titanium oxide serving as active materials, the binder, and the conductive aid in the organic solvent or the water, all the materials may be collectively added to the organic solvent or the water and subjected to dispersion treatment, or the materials may be separately added thereto and subjected to dispersion treatment. It is preferred that the binder, the conductive aid, and the active materials be sequentially added in the stated order to the organic solvent or the water and subjected to dispersion treatment because the materials can be uniformly dispersed in the solvent. When the electrode mixture paste contains other components, the other components may be collectively added to the solvent and subjected to dispersion treatment, but dispersion treatment is preferably performed every time one kind of the other components is added.

Although a method for the dispersion treatment is not particularly limited, for example, a ball mill, a sand mill, a bead mill, a cyclone mill, a zero mill, a pigment dispersing machine, a grinding machine, an ultrasonic dispersing machine, a homogenizer, a disper, a rotation-revolution mixer, a planetary mixer, a FILMIX, and a JET PASTER, which are typically used, may each be used as an industrial method.

Examples of the collector include conductive materials, such as titanium, a titanium alloy, aluminum, an aluminum alloy, copper, nickel, stainless steel, nickel-plated steel, carbon, and a conductive resin. Examples of the shape of the collector include a foil shape, a plate shape, a mesh shape, a three-dimensional network shape, a foamed shape, and a nonwoven fabric shape, and the collector may be any one of a porous collector and a nonporous collector. In addition, each of those conductive materials may be subjected to surface treatment for improving its adhesiveness and electrical characteristics. Of those conductive materials, aluminum is preferred from the viewpoints of conductivity and cost, and aluminum foil is particularly preferred. Although the thickness of the collector is not particularly limited, when the collector is a foil shape, the thickness is typically from 5 µm to 30 µm.

Although a method of applying the electrode mixture paste onto the collector is not particularly limited, for example, a die coater method, a comma coater method, a curtain coater method, a spray coater method, a gravure coater method, a flexo coater method, a knife coater method, a doctor blade method, a reverse roll method, a brush coating method, or a dipping method may be used. The die coater method, the knife coater method, the doctor blade method, and the comma coater method are preferred because each of the methods enables the obtainment of a satisfactory surface state of the coating film of the electrode mixture paste in accordance with the viscosity and drying property of the electrode mixture paste.

The application of the electrode mixture paste onto the collector may be performed on one surface of the collector, or may be performed on both the surfaces thereof. When the paste is applied to both the surfaces of the collector, the paste may be applied to the surfaces sequentially one by one, or may be applied to both the surfaces at the same time. In addition, the paste may be continuously applied to the surface of the collector, may be intermittently applied thereto, or may be applied thereto in a stripe manner. The thickness, length, and width of the coating film may be appropriately determined in accordance with, for example, the size of the battery.

A method of drying the coating film of the electrode mixture paste applied onto the collector is not particularly limited, and a known method may be used. Examples of the drying method include: drying with warm air, hot air, or low-humidity air; vacuum drying; still standing in a heating furnace or the like; and drying by irradiation with a far infrared ray, an infrared ray, an electron beam, or the like. Those drying methods may be performed in combination. Although a temperature in the case of the heating is generally from about 50° C. to about 180° C., conditions such as the temperature may be appropriately set in accordance with, for example, the application amount of the electrode mixture paste, the boiling point of the used solvent, and the kind of the binder. The drying volatilizes a volatile component such as the solvent from the coating film of the electrode mixture paste to result in the formation of an electrode mixture layer on the collector.

The SPAN is originally a material free of lithium, but has an irreversible capacity, and hence may be doped with lithium in advance. Examples of a method of doping the SPAN with lithium include: a method of inserting lithium by an electrolytic doping method including assembling a half-cell through use of metal lithium as a counter electrode and electrochemically doping the SPAN with lithium; a method of inserting lithium by a bonding doping method including bonding metal lithium foil to the electrode and then leaving the resultant to stand in an electrolytic solution to perform doping through utilization of the diffusion of lithium in the electrode; a mechanical doping method including causing the active material layer containing the SPAN and a lithium metal to mechanically collide with each other to insert lithium into the layer; and a chemical doping method including immersing the electrode in a lithium naphthalenide solution to insert lithium into the layer. However, the present invention is not limited to those methods.

Next, the lithium ion secondary battery of the present invention is described. The lithium ion secondary battery of the present invention includes a positive electrode, a negative electrode, and a lithium salt-containing nonaqueous electrolyte, and is characterized in that the above-mentioned electrode is used as the positive electrode or the negative electrode.

<Method of Producing Counter Electrode>

In the lithium ion secondary battery of the present invention, a counter electrode with respect to the electrode of the present invention is, for example, metal lithium, or an electrode containing, as an active material, a lithium-containing composite oxide, silicon, a silicon oxide, graphite, carbon, or the like.

When the metal lithium is used as the counter electrode, the counter electrode may be formed from the metal lithium and/or a lithium alloy. Alternatively, the counter electrode may include a collector including a conductive material formed of the metal lithium and/or the lithium alloy. In this case, an active material layer containing a lithium metal may be formed. The active material layer may be formed by treatment, such as the bonding of foil-shaped metal lithium, or the electrodeposition or vapor deposition of the metal lithium.

The lithium-containing composite oxide is selected from the group consisting of: a lithium-transition metal composite oxide; a lithium-transition metal silicate compound; and a lithium-transition metal sulfate compound. A transition metal in such compound is not particularly limited, but aluminum, titanium, vanadium, chromium, manganese, iron, cobalt, nickel, copper, zinc, magnesium, gallium, zirconium, niobium, boron, calcium, molybdenum, and tungsten are preferred because the charge-discharge stability of the lithium ion secondary battery becomes satisfactory, aluminum, vanadium, titanium, chromium, manganese, iron, cobalt, nickel, and copper are more preferred because the effect of the present invention becomes remarkable, and aluminum, manganese, iron, cobalt, and nickel are even more preferred because the effect of the present invention becomes further remarkable.

Examples of the lithium-transition metal composite oxide include: $LiCoO_2$; $LiNiO_2$; $LiMnO_2$; a compound represented by the following general formula (2); and a compound represented by the following general formula (3):

$$Li_g Ni_h Co_i M1_j O_2 \quad (2)$$

$$Li_{(1+x)} Mn_{(2-x-y)} M1_y O_4 \quad (3)$$

where "g", "h", "i", and "j" satisfy $0.9 \leq g \leq 1.2$, $0.3 < h < 1$, $0 \leq i \leq 0.5$, $0 \leq j \leq 0.5$ and $h+i+j=1$, "x" satisfies $0 \leq x < 0.5$, and "y" satisfies $0 \leq y < 0.5$. M1 preferably represents at least one kind selected from the group consisting of: aluminum; titanium; vanadium; chromium; manganese; iron; copper; zinc; magnesium; gallium; zirconium; niobium; boron; calcium; molybdenum; and tungsten.

Specific examples of the compound represented by the general formula (2) or the compound represented by the general formula (3) include $LiMn_2O_4$, $LiNi_{0.5}Co_{0.2}Mn_{0.3}O_2$, $LiNi_{0.8}Co_{0.1}Mn_{0.1}O_2$, $LiNi_{0.5}Mn_{1.5}O_4$, $LiNi_{0.80}Co_{0.15}Al_{0.05}O_2$, $LiNi_{0.80}Co_{0.17}Al_{0.03}O_2$, $LiNi_{0.90}Co_{0.05}Al_{0.05}O_2$, $LiNi_{1/3}Co_{1/3}Mn_{1/3}O_2$, $LiNi_{0.6}Co_{0.2}Mn_{0.2}O_2$, $LiNi_{0.9}Co_{0.05}Mn_{0.05}O_2$, $LiMn_{1.8}Al_{0.2}O_4$, $Li_{1.1}Mn_{1.8}Mg_{0.1}O_4$, $Li_{1.1}Mn_{1.85}Al_{0.05}O_4$, and $Li_2MnO_3$-$LiMO_2$ (M=cobalt, nickel, or manganese).

As the lithium-transition metal composite oxide, for example, $LiCoO_2$, $LiMn_2O_4$, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, and $LiNi_{0.8}Co_{0.15}Al_{0.05}O_2$ are preferred because the charge-discharge stability of the lithium ion secondary battery becomes satisfactory.

An example of the lithium-transition metal phosphate compound is a compound represented by the following general formula (4):

$$Li_k M2_m (PO_4)_n F_p \quad (4)$$

where "k" satisfies $0 < k \leq 3$, "m" satisfies $0.5 \leq m \leq 2$, "n" satisfies $1 \leq n \leq 3$, and "p" satisfies $0 \leq p \leq 1$, and M2 represents at least one kind selected from the group consisting of: iron; cobalt; nickel; manganese; copper; titanium; tungsten; molybdenum; chromium; vanadium; and vanadium(II) monoxide. M2 preferably represents at least one kind selected from the group consisting of: iron; cobalt; nickel; manganese; copper; vanadium; and vanadium(II) monoxide because the charge-discharge stability of the lithium ion secondary battery becomes satisfactory. In addition, part of M2s may be substituted with one or more kinds of other metals, such as aluminum, zinc, magnesium, zirconium, gallium, and niobium.

Specific examples of the lithium-transition metal phosphate compound include $LiFePO_4$, $LiMn_xFe_{1-x}PO_4$, $LiCuPO_4$, $LiNiPO_4$, $LiCoPO_4$, $LiMnPO_4$, $LiVOPO_4$, $Li_2FePO_4$, $Li_2NiPO_4$, $Li_2CoPO_4$, $Li_2MnPO_4$, $Li_2NiPO_4F$, $Li_2CoPO_4F$, $Li_2MnPO_4F$, $Li_2FePO_4F$, $Li_3V_2(PO_4)_3$, $LiMn_{7/8}Fe_{1/8}PO_4$, $LiMn_{2/3}Fe_{1/3}PO_4$, $LiFe_{0.9}Mn_{0.1}PO_4$, $LiFe_{0.2}Mn_{0.8}PO_4$, $LiFe_{0.15}Mn_{0.75}Mg_{0.1}PO_4$, and $LiFe_{0.19}Mn_{0.75}Zr_{0.03}PO_4$.

As the lithium-transition metal phosphate compound, $LiFePO_4$, $LiCuPO_4$, $LiNiPO_4$, $LiCoPO_4$, $LiMnPO_4$, and $LiVOPO_4$ are preferred, and $LiFePO_4$, $LiNiPO_4$, $LiCoPO_4$, and $LiMnPO_4$ are more preferred because the charge-discharge stability of the lithium ion secondary battery becomes satisfactory.

The active material of the counter electrode is preferably formed into a desired particle diameter by a method, such as pulverization or granulation, and is preferably further classified. Examples of methods for the pulverization and the classification include the same methods as those described in the methods of pulverizing and classifying the SPAN.

The average secondary particle diameter (D50) of the active material of the counter electrode is preferably from 0.1 μm to 50 μm, more preferably from 0.5 μm to 50 μm, even more preferably from 1 μm to 30 μm. When the average secondary particle diameter of the active material of the counter electrode is more than 50 μm, it may be impossible to form a uniform and smooth active material layer. Meanwhile, when the average secondary particle diameter of the active material of the counter electrode is less than 0.1 μm, a side reaction is liable to occur owing to the deterioration of the handleability of the electrode or an increase in specific surface area thereof, and the side reaction may adversely affect the charge-discharge stability of the lithium ion secondary battery.

The counter electrode may be produced in conformity with a known method. The counter electrode including the active material layer formed on the collector may be produced by turning a blend, which contains the active material of the counter electrode, a binder, and a conductive aid, into slurry with an organic solvent or water to produce an electrode mixture paste, applying the electrode mixture paste onto the collector, and drying the paste.

Examples of the binder to be used in the counter electrode include the same binders as those described above. Of those, polyvinylidene fluoride, polyimide, polyacrylonitrile, polytetrafluoroethylene, polyacrylic acid, or sodium carboxymethylcellulose is preferred because the charge-discharge stability becomes satisfactory.

The content of the binder is preferably from 0.5 part by mass to 30 parts by mass, more preferably from 1 part by mass to 20 parts by mass with respect to 100 parts by mass of the active material of the counter electrode.

Examples of the conductive aid to be used in the counter electrode include the same conductive aids as those described above.

The content of the conductive aid is preferably from 0.1 part by mass to 50 parts by mass, more preferably from 0.5 part by mass to 30 parts by mass, even more preferably from 1 part by mass to 20 parts by mass with respect to 100 parts by mass of the active material of the counter electrode.

The same solvent as the solvent for preparing the above-mentioned electrode mixture paste may be used as the solvent for preparing the electrode mixture paste for the counter electrode. The usage amount of the solvent may be adjusted in accordance with an application method to be selected at the time of the application of the electrode mixture paste. In the case of, for example, application by a doctor blade method, the content is preferably from 10 parts by mass to 300 parts by mass, more preferably from 20 parts by mass to 200 parts by mass with respect to 100 parts by mass of the total amount of the active material of the counter electrode, the binder, and the conductive aid.

In addition to the above-mentioned components, any other component, such as a viscosity adjuster, a reinforcing material, an antioxidant, a pH adjuster, or a dispersant, may be incorporated into the electrode mixture paste for the counter electrode to the extent that the effect of the present invention is not impaired. A known component may be used as such other component at a known blending ratio.

In the production of the electrode mixture paste for the counter electrode, at the time of the dispersion or dissolution of the active substance of the counter electrode, the binder, and the conductive aid in the organic solvent or the water, all the materials may be collectively added to the solvent and subjected to dispersion treatment, or the materials may be separately added thereto and subjected to dispersion treatment. It is preferred that the binder, the conductive aid, and the active material of the counter electrode be sequentially added in the stated order to the organic solvent or the water and subjected to dispersion treatment because the materials can be uniformly dispersed in the solvent. When the electrode mixture paste for the counter electrode contains other components, the other components may be collectively added to the solvent and subjected to dispersion treatment, but dispersion treatment is preferably performed every time one kind of the other components is added.

Examples of a method for the dispersion treatment and the collector in the production of the electrode mixture paste for the counter electrode include the same method and collector as those described in the production of the above-mentioned electrode mixture paste.

The same methods as those described as the method of applying the above-mentioned electrode mixture paste onto the collector and the method of drying the electrode mixture paste may be utilized as a method of applying the electrode mixture paste for the counter electrode onto the collector and a method of drying the electrode mixture paste for the counter electrode.

<Method of Producing Lithium Ion Secondary Battery>

The lithium ion secondary battery of the present invention may be produced by using a known method of producing a lithium ion secondary battery except that the electrode containing the SPAN and the lithium-titanium oxide is used as a working electrode. The battery may be produced by, for example, interposing a separator between the working electrode and a counter electrode, holding the resultant in a battery cell, and introducing a nonaqueous electrolytic solution into the battery cell, followed by the tight closing and sealing of the cell. The respective materials of the lithium ion secondary battery are described below.

<Nonaqueous Electrolyte>

Examples of the nonaqueous electrolyte that may be used in the lithium ion secondary battery of the present invention may include: a liquid nonaqueous electrolyte obtained by dissolving a lithium salt in an organic solvent; a polymer gel-like nonaqueous electrolyte obtained by dissolving or dispersing the lithium salt through use of polymer gel, which is obtained by dissolving a polymer compound in an organic solvent to cause the compound to gel, as a solvent or a dispersion medium; a polymer nonaqueous electrolyte obtained by dispersing the lithium salt through use of a polymer as a dispersion medium without use of any solvent (herein, an electrolyte obtained by dispersing the lithium salt through use of a polymer as a dispersion medium without use of any solvent is defined as a polymer electrolyte); a complex hydride-based solid electrolyte; and an inorganic solid electrolyte.

<Lithium Salt>

The lithium salt to be used in the nonaqueous electrolyte is not particularly limited, and a known lithium salt that may be used as the lithium salt of a lithium ion secondary battery may be used. Specific examples of the lithium salt include $LiPF_6$, $LiBF_4$, $LiAsF_6$, $LiCF_3SO_3$, $LiCF_3CO_2$, $LiN(CF_3SO_2)_2$, $LiN(C_2F_5SO_2)_2$, $LiN(SO_2F)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, LiSCN, $LiClO_4$, LiCl, LiF, LiBr, LiI, $LiAlF_4$, $LiAlCl_4$, $LiPO_2F_2$, and derivatives thereof.

One or more kinds selected from the group consisting of: $LiPF_6$; $LiBF_4$; $LiClO_4$; $LiCF_3SO_3$; $LiN(CF_3SO_2)_2$; $LiN(C_2F_5SO_2)_2$; $LiN(SO_2F)_2$; $LiPO_2F_2$; $LiC(CF_3SO_2)_3$; a derivative of $LiCF_3SO_3$; and a derivative of $LiC(CF_3SO_2)_3$ are each preferably used as the lithium salt to be used for each of the liquid electrolyte and the polymer gel-like electrolyte.

One or more kinds selected from the group consisting of: $LiPF_6$; $LiBF_4$; $LiClO_4$; $LiN(CF_3SO_2)_2$; $LiN(C_2F_5SO_2)_2$; $LiN(SO_2F)_2$; $LiC(CF_3SO_2)_3$; $LiB(CF_3SO_3)_4$; and $LiB(C_2O_4)_2$ are each preferably used as the lithium salt to be used for the polymer electrolyte (or the polymer electrolyte obtained by dispersing the lithium salt without use of any solvent).

When the concentration of the lithium salt in the nonaqueous electrolyte is excessively low, a sufficient current density may not be obtained. Meanwhile, when the concentration is excessively high, the stability of the nonaqueous electrolyte may be impaired. Accordingly, the concentration of the lithium salt is preferably from 0.5 mol/L to 7 mol/L, more preferably from 0.8 mol/L to 1.8 mol/L.

<Liquid Nonaqueous Electrolyte>

When the liquid nonaqueous electrolyte is used as the nonaqueous electrolyte, the electrolyte preferably contains at least one kind of compound selected from cyclic carbonate compounds.

Examples of the cyclic carbonate compound include: saturated cyclic carbonate compounds, such as ethylene carbonate, 1,2-propylene carbonate, 1,3-propylene carbonate, 1,2-butylene carbonate, 1,3-butylene carbonate, and 1,1-dimethylethylene carbonate; and unsaturated cyclic carbonate compounds, such as vinylene carbonate, vinylethylene carbonate, propylidene carbonate, ethylene ethylidene carbonate, and ethylene isopropylidene carbonate. Part of the hydrogen atoms of each of those cyclic carbonate compounds may be substituted with a fluorine atom.

When the nonaqueous electrolyte contains the cyclic carbonate compound, the electrolyte preferably further contains a chain carbonate compound because the compound reduces the viscosity of the electrolyte to improve the ionic conductivity thereof. Examples of the chain carbonate compound include: saturated chain carbonate compounds, such as dimethyl carbonate, ethyl methyl carbonate, diethyl carbonate, and dipropyl carbonate; and unsaturated chain carbonate compounds, such as dipropargyl carbonate, propargyl methyl carbonate, ethyl propargyl carbonate, bis(1-methylpropargyl) carbonate, and bis(1-dimethylpropargyl) carbonate. Part of the hydrogen atoms of each of those chain carbonate compounds may be substituted with a fluorine atom.

The liquid nonaqueous electrolyte is preferably propylene carbonate, a mixed solvent of ethylene carbonate and dimethyl carbonate, a mixed solvent of ethylene carbonate and ethyl methyl carbonate, a mixed solvent of ethylene carbonate and diethyl carbonate, a mixed solvent of propylene carbonate and dimethyl carbonate, a mixed solvent of propylene carbonate and diethyl carbonate, or a mixed solvent of propylene carbonate, ethylene carbonate, and ethyl methyl carbonate, more preferably propylene carbonate, a mixed solvent of ethylene carbonate and ethyl methyl carbonate, a mixed solvent of ethylene carbonate and diethyl carbonate, a mixed solvent of propylene carbonate and diethyl carbonate, or a mixed solvent of propylene carbonate, ethylene carbonate, and ethyl methyl carbonate from the viewpoints of the performance and storage stability of the lithium ion secondary battery.

When the liquid nonaqueous electrolyte further contains the chain carbonate compound, a mixing ratio between the cyclic carbonate compound and the chain carbonate compound is preferably as follows: the amount of the chain carbonate compound is from 10 parts by volume to 1,000 parts by volume with respect to 100 parts by volume of the cyclic carbonate compound. When the amount of the chain carbonate compound is less than 10 parts by volume, the performance of the lithium ion secondary battery may reduce. Meanwhile, when the amount of the chain carbonate compound is more than 1,000 parts by volume, the charge-discharge stability of the lithium ion secondary battery at high temperature may reduce.

The liquid nonaqueous electrolyte may contain an organic solvent to be typically used in the nonaqueous electrolyte of a lithium ion secondary battery. Specific examples of the organic solvent include a saturated cyclic ester compound, a sulfoxide compound, a sulfone compound, an amide compound, a chain ether compound, a cyclic ether compound, and a saturated chain ester compound. Those organic solvents may be added alone or in combination thereof.

Examples of the saturated cyclic ester compound include γ-butyrolactone, γ-valerolactone, γ-caprolactone, δ-hexanolactone, and δ-octanolactone.

Examples of the sulfoxide compound include dimethyl sulfoxide, diethyl sulfoxide, dipropyl sulfoxide, diphenyl sulfoxide, and thiophene.

Examples of the sulfone compound include dimethylsulfone, diethylsulfone, dipropylsulfone, diphenylsulfone, sulfolane (also referred to as tetramethylenesulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene. Of those, sulfolane and tetramethylsulfolane are preferred.

Examples of the amide compound include N-methylpyrrolidone, dimethylformamide, and dimethylacetamide.

Examples of the chain ether compound and the cyclic ether compound include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl) ether, propylene glycol bis(trifluoroethyl) ether, ethylene glycol bis(trifluoromethyl) ether, and diethylene glycol bis(trifluoroethyl) ether. Of those, dioxolane is preferred.

As the saturated chain ester compound, a monoester compound and a diester compound each having 2 to 8 carbon atoms in total in a molecule thereof are preferred. Specific examples of the compound include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Of those, methyl formate, ethyl formate, methyl acetate, ethyl acetate, propyl acetate, isobutyl acetate, butyl acetate, methyl propionate, and ethyl propionate are preferred.

For example, acetonitrile, propionitrile, nitromethane, derivatives thereof, and various ionic liquids may be used as other organic solvents.

<Polymer Gel-Like Nonaqueous Electrolyte>

Examples of the polymer that may be utilized as the polymer gel include polyethylene oxide, polypropylene oxide, polyvinyl chloride, polyacrylonitrile, polymethyl methacrylate, polyethylene, polyvinylidene fluoride, polyhexafluoropropylene, and polystyrene sulfonic acid. An organic solvent, a lithium salt, and a production method that are known in the art may be adopted as the organic solvent for dissolving the polymer to cause the polymer to gel, a blending ratio between the lithium salt and the polymer gel, and a method of producing the polymer gel without any particular limitation.

<Polymer Nonaqueous Electrolyte>

Examples of the polymer that may be used in the polymer nonaqueous electrolyte obtained by dispersing the lithium salt through use of the polymer as a dispersion medium without use of any solvent include polyethylene oxide, polypropylene oxide, and polystyrene sulfonic acid.

A blending ratio and a production method that are known in the art may be adopted as a blending ratio between the lithium salt and polymer of the polymer nonaqueous electrolyte, and a method of producing the polymer nonaqueous electrolyte without any particular limitation.

<Complex Hydride-Based Solid Electrolyte>

Examples of the complex hydride-based solid electrolyte include $Li(CB_9H_{10})$, $Li(CB_{11}H_{12})$, $Li_2(B_{12}H_{12})$, $Li(BH_4)$, $3(LiBH_4)$—LiI, $Li(NH_2)$, $Li(AlH_4)$, $Li_3(AlH_6)$, $3(LiBH_4)$—$Li(NH_2)$, $Li(BH_4)$—$Li(NH_2)$, $0.7Li(CB_9H_{10})$-$0.3Li(CB_{11}H_{12})$, $Li(BH_4)$-3KI, $Li(BH_4)$—$P_2I_4$, $Li(BH_4)$—$P_2S_5$, $Li_2(NH_2)$, $Li(BH_4)$—$GdCl_3$, $Li(BH_4)$—NaI, and $Li(BH_4)$-$3Li(NH_2)$.

<Inorganic Solid Electrolyte>

Examples of the inorganic solid electrolyte include a sulfide-based solid electrolyte, an oxide-based solid electrolyte, and a phosphoric acid-based solid electrolyte.

Examples of the sulfide-based solid electrolyte may include a $Li_2S$—$P_2S_5$-based compound, a $Li_2S$—$SiS_2$-based compound, a $Li_2S$—$GeS_2$-based compound, a $Li_2S$—$B_2S_3$-based compound, a $Li_2S$—$P_2S_3$-based compound, LiI—$Si_2S$—$P_2S_5$, LiI—$Li_2S$—$P_2O_5$, LiI—$Li_3PO_4$—$P_2S_5$, and $Li_{10}GeP_2S_{12}$. The expression "-based compound" as used herein is used as a general name for solid electrolytes each mainly containing a raw material, such as "$Li_2S$" or "$P_2S_5$", described before the term "-based compound." For example, the $Li_2S$—$P_2S_5$-based compound encompasses a solid electrolyte, which mainly contains $Li_2S$ and $P_2S_5$, and may further contain any other raw material. In addition, the $Li_2S$—$P_2S_5$-based compound encompasses a solid electrolyte in which the mixing ratios of $Li_2S$ and $P_2S_5$ are different from each other.

Examples of the $Li_2S$—$P_2S_5$-based compound may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, and $Li_2S$—$P_2S_5$—$Z_mS_n$ (where Z represents Ge, Zn, or Ga, and "m" and "n" each represent a positive number).

Examples of the $Li_2S$—$SiS_2$-based compound may include $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$Li_3PO_4$, $Li_2S$—$SiS_2$—$Li_2SO_4$, and $Li_2S$—$SiS_2$-$Li_xMO_y$ (where M represents P, Si, Ge, B, Al, Ga, or In, and "x" and "y" each represent a positive number).

Examples of the $Li_2S$—$GeS_2$-based compound may include $Li_2S$—$GeS_2$ and $Li_2S$—$GeS_2$—$P_2S_5$.

Examples of the oxide-based solid electrolyte include oxides, such as a perovskite-type oxide, a nasicon-type oxide, a lisicon-type oxide, a garnet-type oxide, and β-alumina.

Examples of the perovskite-type oxide include: a Li—La—Ti-based perovskite-type oxide represented like $Li_aLa_{1-a}TiO_3$ or the like; a Li—La—Ta-based perovskite-type oxide represented like $Li_bLa_{1-b}TaO_3$ or the like; and a Li—La—Nb-based perovskite-type oxide represented like $Li_cLa_{1-c}NbO_3$ or the like (where 0<a<1, 0<b<1, and 0<c<1).

The nasicon-type oxide is, for example, an oxide represented by $Li_eX_fY_gP_hO_j$, the oxide using a crystal typified by $Li_{d+1}Al_dTi_{2-d}(PO_4)_3$ or the like as an oikocryst (where X represents B, Al, Ga, In, C, Si, Ge, Sn, Sb, or Se, Y represents Ti, Zr, Ge, In, Ga, Sn, or Al, 0≤d≤1, and "e", "f", "g", "h", and "j" each represent a positive number). The nasicon-type oxide is specifically, for example, $LiTi_2(PO_4)_3$.

The lisicon-type oxide is, for example, an oxide represented by $Li_4XO_4$—$Li_3YO_4$ (where X represents Si, Ge, or Ti, and Y represents P, As, or V).

Examples of the garnet-type oxide include a Li—La—Zr-based oxide typified by $Li_7La_3Zr_2O_{12}$ or the like, and a derivative thereof.

In the lithium ion secondary battery of the present invention, the form of the nonaqueous electrolyte is not particularly limited. However, the liquid nonaqueous electrolyte is preferably used because its production process is simple.

The nonaqueous electrolyte may further contain a known electrolyte additive, such as an electrode film-forming agent, an antioxidant, a flame retardant, or an overcharge inhibitor, for, for example, improving the life of the battery and improving the safety thereof. When the electrolyte additive is used, its concentration is preferably from 0.01 mass % to 10 mass %, more preferably from 0.1 mass % to 5 mass % with respect to the nonaqueous electrolyte. When the concentration is less than 0.01 mass %, the effect of the addition of the additive cannot be exhibited in some cases, and when the concentration is more than 10 mass %, the additive may adversely affect the characteristics of the lithium ion secondary battery.

<Separator>

When the liquid nonaqueous electrolyte is used as the nonaqueous electrolyte in the lithium ion secondary battery of the present invention, a separator is preferably interposed between the working electrode and counter electrode of the battery. A product selected from a polymer film, a nonwoven fabric, and a glass filter to be typically used in a lithium ion secondary battery may be used as the separator without any particular limitation. Specific examples of the polymer film include films formed of: polyethylene; polypropylene; polyvinylidene fluoride; polyvinylidene chloride; polyacrylonitrile; polyacrylamide; polytetrafluoroethylene; polysulfone; polyethersulfone; polycarbonate; polyamide; polyimide; polyethers, such as polyethylene oxide and polypropylene oxide; various celluloses, such as carboxymethylcellulose and hydroxypropylcellulose; polymer compounds, which contain poly(meth)acrylic acid, and various esters thereof and the like as main components, and derivatives thereof; and copolymers and mixtures thereof. Those polymer films may each be coated with a ceramic material, such as alumina or silica, magnesium oxide, an aramid resin, or polyvinylidene fluoride. Those polymer films may be used alone, or those films may be superimposed on each other to be used as a multilayer film. Further, various additives may be used in those polymer films, and their kinds and contents are not particularly limited. Of those polymer films, a film formed of a material selected from polyethylene, polypropylene, polyvinylidene fluoride, and polysulfone is preferably used.

Films that have been made microporous are used as those polymer films so that the films may each be easily permeated with the nonaqueous electrolyte to transmit an ion. Examples of a method of making each of the films microporous include: a "phase separation method" including forming a film while subjecting a solution of a polymer compound and a solvent to a microphase separation, and extracting and removing the solvent to make the film porous; and a "stretching method" including extruding the polymer compound, which has been melted, at a high draft to form a film, then subjecting the film to heat treatment to align its crystal molecules in one direction, and performing stretching to form a gap between the crystal molecules, to thereby make the film porous. The methods are appropriately selected depending on the polymer films to be used.

When the polymer gel-like electrolyte, the polymer electrolyte (or the polymer electrolyte obtained by dispersing the lithium salt without use of any solvent), the complex hydride-based solid electrolyte, or the inorganic solid electrolyte is used as the nonaqueous electrolyte, the lithium ion secondary battery may be free of any separator.

<Outer Packaging>

The shape of the lithium ion secondary battery of the present invention is not particularly limited, and the battery may be provided as batteries having various shapes, such as a coin-type battery, a cylindrical battery, a rectangular battery, and a laminated battery. A metal container or a laminated film may be used as an outer packaging member for the battery. The thickness of the outer packaging member is typically 0.5 mm or less, preferably 0.3 mm or less. Examples of the shape of the outer packaging member include a flat shape (thin shape), a rectangular shape, a cylindrical shape, a coin shape, and a button shape.

The metal container is, for example, a container formed from stainless steel, aluminum, or an aluminum alloy. The aluminum alloy is preferably an alloy containing an element, such as magnesium, zinc, or silicon. When the content of a transition metal, such as iron, copper, nickel, or chromium, in aluminum or the aluminum alloy is set to 1% or less, the long-term reliability and heat-radiating property of the container under a high-temperature environment can be drastically improved.

A multilayer film including a metal layer between resin films may be used as the laminated film. The metal layer is preferably aluminum foil or aluminum alloy foil for a weight reduction. A polymer material, such as polypropylene, polyethylene, nylon, or polyethylene terephthalate, may be used in each of the resin films. The laminated film may be sealed by heat sealing to form the outer packaging member.

Figure 1:
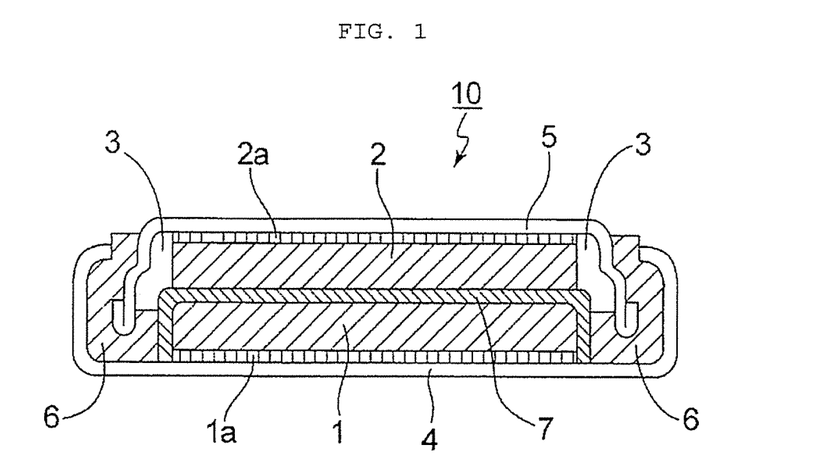
FIG. 1 is a longitudinal sectional view for schematically illustrating an example of the structure of a coin-type battery based on a lithium ion secondary battery of the present invention.
Figure 2:
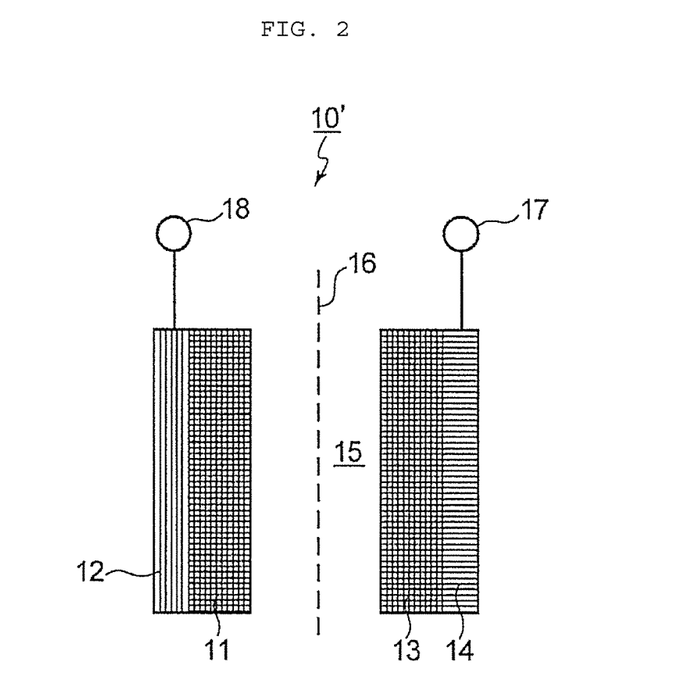
FIG. 2 is a schematic view for illustrating the basic configuration of a cylindrical battery based on the lithium ion secondary battery of the present invention.
Figure 3:
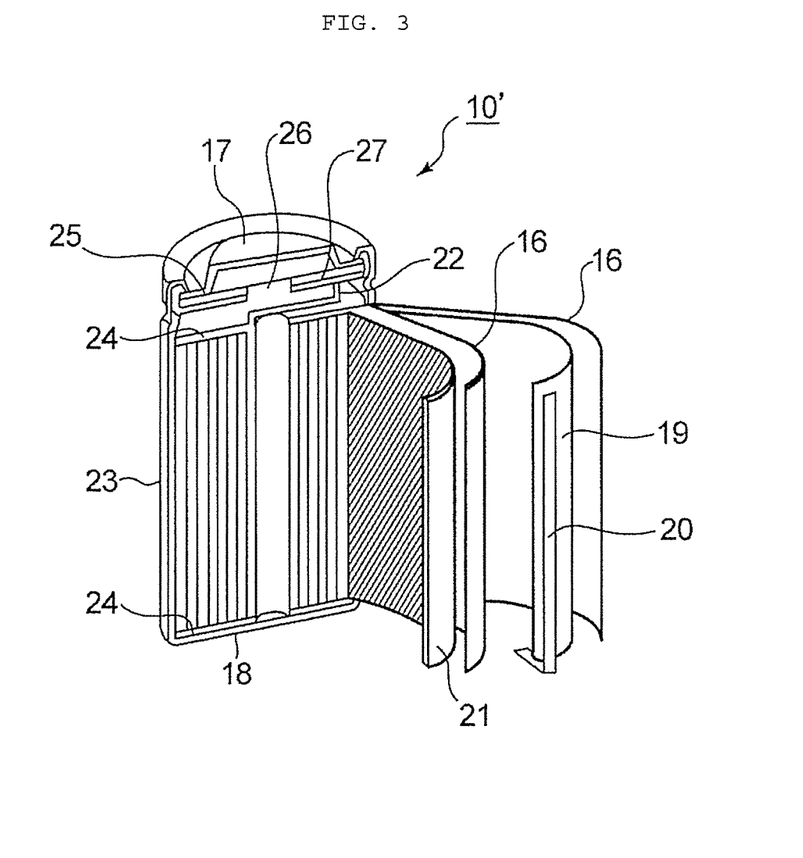
FIG. 3 is a perspective view for illustrating the internal structure of the cylindrical battery based on the lithium ion secondary battery of the present invention as a section.
Figure 4:
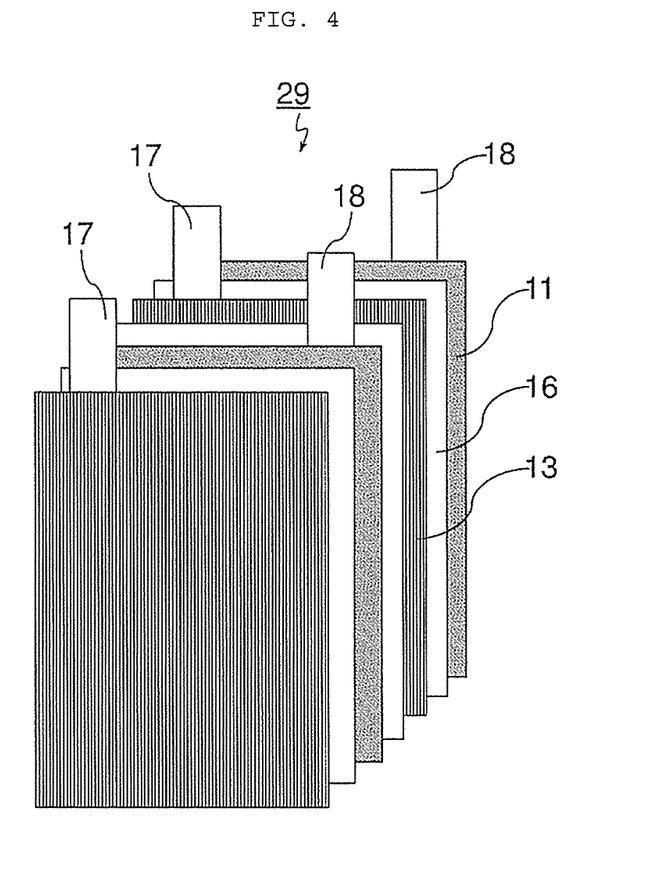
FIG. 4 is an exploded perspective view for schematically illustrating a laminated electrode group in a laminated battery based on the lithium ion secondary battery of the present invention.
Figure 5:
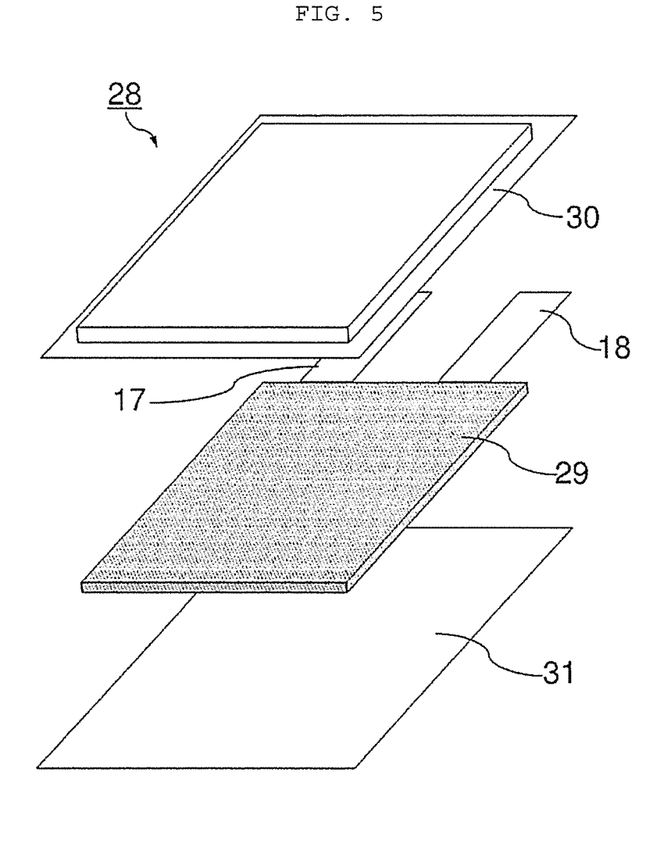
FIG. 5 is an exploded perspective view for schematically illustrating the laminated battery based on the lithium ion secondary battery of the present invention.
Figure 6:
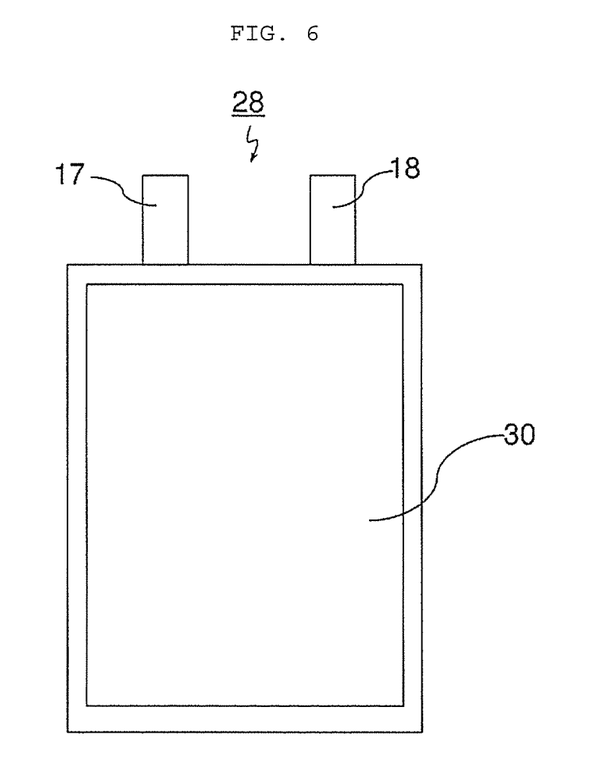
FIG. 6 is an appearance plan view for schematically illustrating the laminated battery based on the lithium ion secondary battery of the present invention.

FIG. 1 is an illustration of an example of a coin-type battery based on the lithium ion secondary battery of the present invention, FIG. 2 and FIG. 3 are each an illustration of an example of a cylindrical battery based on the battery, and FIG. 4 to FIG. 6 are each an illustration of an example of a laminated battery based on the battery.

A coin-type lithium ion secondary battery 10 illustrated in FIG. 1 includes: a positive electrode 1 that can emit a lithium ion; a positive electrode collector 1a; a negative electrode 2 that can occlude and emit the lithium ion emitted from the positive electrode; a negative electrode collector 2a; a nonaqueous electrolyte 3; a stainless steel-made positive electrode case 4; a stainless steel-made negative electrode case 5; a polypropylene-made gasket 6; and a polyethylene-made separator 7.

A cylindrical lithium ion secondary battery 10' illustrated in each of FIG. 2 and FIG. 3 includes: a negative electrode 11; a negative electrode collector 12; a positive electrode 13; a positive electrode collector 14; a nonaqueous electrolyte 15; a separator 16; a positive electrode terminal 17; a negative electrode terminal 18; a negative electrode plate 19;

a negative electrode lead 20; a positive electrode plate 21; a positive electrode lead 22; a case 23; an insulating plate 24; a gasket 25; a safety valve 26; and a PTC element 27.

FIG. 4 is an exploded perspective view for schematically illustrating the electrode group 29 of a laminated lithium ion secondary battery 28. Examples to be described later are described by using a laminated lithium ion secondary battery, but the present invention is not limited thereto. The electrode group 29 has, for example, a structure in which the sheet-shaped negative electrode 11, the sheet-shaped positive electrode 13, and the sheet-shaped separator 16 for partitioning the negative electrode 11 and the positive electrode 13 are alternately laminated. The electrode group includes the positive electrode terminal 17 and the negative electrode terminal 18.

FIG. 5 is an exploded perspective view for schematically illustrating the laminated lithium ion secondary battery 28, and FIG. 6 is an appearance plan view for schematically illustrating the laminated lithium ion secondary battery 28. The battery includes: the positive electrode terminal 17; the negative electrode terminal 18; the electrode group 29; a case-side laminated film 30; and a cap-side laminated film 31.

The embodiments of the present invention have been described above, but the present invention is not limited to the above-mentioned embodiments. The present invention may be carried out in various modes subjected to modifications, improvements, and the like that may be performed by a person skilled in the art as long as the modes do not depart from the gist thereof.

EXAMPLES

The present invention is more specifically described below by way of Examples and Comparative Examples. The present invention is not limited to these Examples.

[Production Example 1] Production of SPAN

A mixture obtained by mixing 200 parts by mass of sulfur (manufactured by Sigma-Aldrich Co. LLC, particle diameter: 200 µm, powder) and 100 parts by mass of polyacrylonitrile powder (manufactured by Sigma-Aldrich Co. LLC, classified with a sieve having an opening diameter of 30 µm) was loaded into an alumina Tammann tube. After that, the opening portion of the alumina Tammann tube was capped with a rubber stopper mounted with a thermocouple, a gas-introducing tube, and a gas-discharging tube. While an argon gas was introduced into the alumina Tammann tube at a flow rate of 100 cc/min, the mixture was heated at a rate of temperature increase of 5° C./min, and the heating was stopped at the time point when its temperature reached 360° C. However, the temperature increased to 400° C. After having been naturally left standing to cool to room temperature, the reaction product was removed from the alumina Tammann tube. Elemental sulfur was removed from the resultant reaction product by heating, and then the residue was pulverized to provide SPAN. The resultant SPAN had an average secondary particle diameter of 9 µm and a sulfur content of 38 mass %.

[Production Example 2] Production of Carbon-Coated LTO

A lithium-titanium oxide ($Li_4Ti_5O_{12}$) (manufactured by Ishihara Sangyo Kaisha, Ltd., average particle diameter: 7 µm) and 100 ml of pure water were loaded into a 250- milliliter round-bottom flask. The mixture was stirred for 1 hour, and was irradiated with an ultrasonic wave for 6 minutes. After the resultant slurry had been cooled in an ice bath, 3 g of acrylonitrile and 25 mg of 2,2'-azobis(isobutyronitrile) were added to the slurry, and the mixture was irradiated with an ultrasonic wave for 6 minutes. Next, under nitrogen reflux, the slurry was deaerated for 30 minutes, and then its temperature was increased to 70° C., followed by heating for 12 hours. The resultant slurry was dried in a vacuum, and was then left at rest at normal temperature (25° C.)

Under air, the temperature of the slurry was increased from 25° C. to 240° C. at a rate of 5° C./min, and was held at 240° C. for 1 hour. Further, under nitrogen reflux, the temperature was increased to 700° C. at a rate of 5° C./min to produce a carbon-coated LTO in which the surface of the lithium-titanium oxide was coated with carbon. The resultant carbon-coated LTO had an average particle diameter of 8 µm.

[Example 1] Production of Electrode A 45.0 Parts by mass of the SPAN produced in Production Example 1 and 45.0 parts by mass of a lithium-titanium oxide ($Li_4Ti_5O_{12}$) (manufactured by Ishihara Sangyo Kaisha, Ltd., average secondary particle diameter: 7 µm) serving as electrode active materials, 5.0 parts by mass of acetylene black (manufactured by Denka Company Limited) serving as a conductive aid, and 3.0 parts by mass (solid content) of a styrene-butadiene rubber (40 mass % aqueous dispersion, manufactured by Zeon Corporation) and 2.0 parts by mass of sodium carboxymethylcellulose (manufactured by Daicel Fine Chem Ltd.) serving as binders were added to 110 parts by mass of water serving as a solvent, and the materials were mixed with a rotation-revolution mixer under the conditions of a revolution speed of 1,600 rpm and a rotation speed of 640 rpm for 30 minutes to prepare an electrode mixture paste.

The resultant electrode mixture paste was applied to one surface of a collector formed of carbon-coated aluminum foil (thickness: 22 µm) by a doctor blade method, and was left at rest at 80° C. for 1 hour to be dried, followed by press molding. Thus, an active material layer was formed on the collector. After that, the aluminum foil having formed thereon the active material layer was cut into a predetermined size (circular shape), and was dried in a vacuum at 130° C. for 2 hours immediately before its use. Thus, an electrode A was produced.

[Example 2] Production of Electrode B

An electrode B was produced by the same procedure as that of Example 1 except that the electrode active materials in Example 1 were changed to 72 parts by mass of the SPAN produced in Production Example 1 and 18 parts by mass of a lithium-titanium oxide ($Li_4Ti_5O_{12}$) (manufactured by Ishihara Sangyo Kaisha, Ltd., average secondary particle diameter: 7 µm).

[Example 3] Production of Electrode C

An electrode C was produced by the same procedure as that of Example 1 except that the electrode active materials in Example 1 were changed to 18 parts by mass of the SPAN produced in Production Example 1 and 72 parts by mass of a lithium-titanium oxide ($Li_4Ti_5O_{12}$) (manufactured by Ishihara Sangyo Kaisha, Ltd., average secondary particle diameter: 7 μm).

[Comparative Example 1] Production of Electrode D

An electrode D was produced by the same procedure as that of Example 1 except that the electrode active materials in Example 1 were changed to 45 parts by mass of the SPAN produced in Production Example 1 and 45 parts by mass of a lithium-titanium oxide ($Li_4Ti_5O_{12}$) (manufactured by Ishihara Sangyo Kaisha, Ltd., average secondary particle diameter: 15 μm).

[Comparative Example 2] Production of Electrode E

An electrode E was produced by the same procedure as that of Example 1 except that the electrode active materials in Example 1 were changed to only 90 parts by mass of the SPAN produced in Production Example 1.

[Comparative Example 3] Production of Electrode F

An electrode F was produced by the same procedure as that of Example 1 except that the electrode active materials in Example 1 were changed to only 90 parts by mass of a lithium-titanium oxide ($Li_4Ti_5O_{12}$) (manufactured by Ishihara Sangyo Kaisha, Ltd., average secondary particle diameter: 7 μm).

[Comparative Example 4] Production of Electrode G

An electrode G was produced by the same procedure as that of Example 1 except that the electrode active materials in Example 1 were changed to only 90 parts by mass of the carbon-coated LTO produced in Production Example 2.

[Comparative Example 5] Production of Electrode H

An electrode H was produced by the same procedure as that of Example 1 except that the electrode active materials in Example 1 were changed to 88 parts by mass of the SPAN produced in Production Example 1 and 2 parts by mass of a lithium-titanium oxide ($Li_4Ti_5O_{12}$) (manufactured by Ishihara Sangyo Kaisha, Ltd., average secondary particle diameter: 7 μm).

[Comparative Example 6] Production of Electrode I

An electrode I was produced by the same procedure as that of Example 1 except that the electrode active materials in Example 1 were changed to 2 parts by mass of the SPAN produced in Production Example 1 and 88 parts by mass of a lithium-titanium oxide ($Li_4Ti_5O_{12}$) (manufactured by Ishihara Sangyo Kaisha, Ltd., average secondary particle diameter: 7 μm).

[Example 4] Production of Lithium Ion Secondary Battery A

The electrode A was used as a working electrode, and a 500-micrometer thick lithium metal cut into a circular shape was used as a counter electrode. A glass filter was interposed as a separator between the working electrode and the counter electrode, and the resultant was held in a case. A nonaqueous electrolyte obtained by adjusting the concentration of $LiPF_6$ in a mixed solvent formed of 30 vol % of ethylene carbonate and 70 vol % of ethyl methyl carbonate to 1.0 ml/L was enclosed as a nonaqueous electrolyte in the case, and the case was tightly closed and sealed with a caulking machine. Thus, a coin-type lithium ion secondary battery A having a diameter of 20 mm and a thickness of 3.2 mm was produced. The battery had a capacity of 3 mAh. A schematic view of the coin-type lithium ion secondary battery is illustrated in FIG. 1.

[Example 5] Production of Lithium Ion Secondary Battery B

A lithium ion secondary battery B was produced by the same procedure as that of Example 4 except that the electrode A serving as a working electrode was changed to the electrode B. The battery had a capacity of 3 mAh.

[Example 6] Production of Lithium Ion Secondary Battery C

A lithium ion secondary battery C was produced by the same procedure as that of Example 4 except that the electrode A serving as a working electrode was changed to the electrode C. The battery had a capacity of 3 mAh.

[Comparative Example 7] Production of Lithium Ion Secondary Battery D

A lithium ion secondary battery D was produced by the same procedure as that of Example 4 except that the electrode A serving as a working electrode was changed to the electrode D. The battery had a capacity of 3 mAh.

[Comparative Example 8] Production of Lithium Ion Secondary Battery E

A lithium ion secondary battery E was produced by the same procedure as that of Example 4 except that the electrode A serving as a working electrode was changed to the electrode E. The battery had a capacity of 3 mAh.

[Comparative Example 9] Production of Lithium Ion Secondary Battery F

A lithium ion secondary battery F was produced by the same procedure as that of Example 4 except that the electrode A serving as a working electrode was changed to the electrode F. The battery had a capacity of 3 mAh.

[Comparative Example 10] Production of Lithium Ion Secondary Battery G

A lithium ion secondary battery G was produced by the same procedure as that of Example 4 except that the electrode A serving as a working electrode was changed to the electrode G. The battery had a capacity of 3 mAh.

[Comparative Example 11] Production of Lithium Ion Secondary Battery H

A lithium ion secondary battery H was produced by the same procedure as that of Example 4 except that the electrode A serving as a working electrode was changed to the electrode H. The battery had a capacity of 3 mAh.

[Comparative Example 12] Production of Lithium Ion Secondary Battery I

A lithium ion secondary battery I was produced by the same procedure as that of Example 4 except that the electrode A serving as a working electrode was changed to the electrode I. The battery had a capacity of 3 mAh.

The following evaluations were performed by using the lithium ion secondary batteries A to I produced in Example 4 to Example 6 and Comparative Example 7 to Comparative Example 12.

(1) Rate Characteristic

Each of the lithium ion secondary batteries was loaded into a thermostat at 25° C., and was subjected to a charge-discharge test a total of 11 times at a charge final voltage of 3.0 V and a discharge final voltage of 1.0 V as follows: the charge-discharge test was performed 5 consecutive times under the conditions of a charge rate of 0.1 C and a discharge rate of 0.1 C; the charge-discharge test was subsequently performed 3 consecutive times under the conditions of a charge rate of 0.1 C and a discharge rate of 5.0 C; and the charge-discharge test was performed 3 consecutive times under the conditions of a charge rate of 0.1 C and a discharge rate of 0.1 C. Thus, the discharge capacities of the battery were measured. The fifth discharge capacity and the eighth discharge capacity were adopted, and the ratio of the eighth discharge capacity to the fifth discharge capacity was calculated as a rate characteristic (%). Those results are separately shown in Table 1. The discharge capacities are represented in the unit of mAh/g.

TABLE 1

| | Working electrode | Counter electrode | Fifth discharge capacity [mAh/g] | Eighth discharge capacity [mAh/g] | Rate characteristic [%] |
|---|---|---|---|---|---|
| Example 4 | Electrode A | Li metal | 350 | 301 | 86 |
| Example 5 | Electrode B | Li metal | 460 | 368 | 80 |
| Example 6 | Electrode C | Li metal | 250 | 220 | 88 |
| Comparative Example 7 | Electrode D | Li metal | 348 | 209 | 60 |
| Comparative Example 8 | Electrode E | Li metal | 530 | 212 | 40 |
| Comparative Example 9 | Electrode F | Li metal | 168 | 146 | 87 |
| Comparative Example 10 | Electrode G | Li metal | 168 | 151 | 90 |
| Comparative Example 11 | Electrode H | Li metal | 520 | 215 | 41 |
| Comparative Example 12 | Electrode I | Li metal | 175 | 152 | 87 |

(2) High-Temperature Storage Stability Test (Calendar Life)

Each of the produced lithium ion secondary batteries was loaded into a thermostat at 25° C., and was subjected to a charge-discharge test 5 consecutive times at a charge final voltage of 3.0 V and a discharge final voltage of 1.0 V under the conditions of a charge rate of 0.1 C and a discharge rate of 0.1 C. Subsequently, the battery was merely charged at a charge rate of 0.1 C. The charged nonaqueous electrolyte secondary battery was stored at 80° C. for 10 days, and was then subjected to the charge-discharge test 3 times under the conditions of a charge rate of 0.1 C and a discharge rate of 0.1 C. Thus, the charge-discharge test was performed a total of 8 times to measure the discharge capacities of the battery. The fifth discharge capacity and the eighth discharge capacity were adopted, and the ratio of the eighth discharge capacity to the fifth discharge capacity was calculated as a calendar life (%). Those results are separately shown in Table 2. The discharge capacities are represented in the unit of mAh/g.

TABLE 2

| | Working electrode | Counter electrode | Fifth discharge capacity (at 25° C.) [mAh/g] | Eighth discharge capacity (at 80° C.) [mAh/g] | Calendar life [%] |
|---|---|---|---|---|---|
| Example 4 | Electrode A | Li metal | 350 | 323 | 92 |
| Example 5 | Electrode B | Li metal | 460 | 422 | 92 |
| Example 6 | Electrode C | Li metal | 250 | 225 | 90 |
| Comparative Example 7 | Electrode D | Li metal | 348 | 318 | 91 |
| Comparative Example 8 | Electrode E | Li metal | 530 | 493 | 93 |
| Comparative Example 9 | Electrode F | Li metal | 168 | 102 | 61 |
| Comparative Example 10 | Electrode G | Li metal | 168 | 111 | 66 |
| Comparative Example 11 | Electrode H | Li metal | 520 | 478 | 92 |
| Comparative Example 12 | Electrode I | Li metal | 175 | 114 | 65 |

As can be seen from the results of Comparative Example 7 to Comparative Example 12 shown in Table 1 and Table 2, none of the lithium ion secondary batteries each having a configuration different from that of the present invention could achieve both of the rate characteristic and the calendar life at high levels. In contrast, it was able to be recognized from the results of Examples 4 to 6 that the lithium ion secondary battery of the present invention was able to achieve both of the rate characteristic and the calendar life at high levels.

[Example 7] Production of all-Solid Secondary Battery J 25.0 Parts by mass of the SPAN produced in Production Example 1 and 25.0 parts by mass of a lithium-titanium oxide ($Li_4Ti_5O_{12}$) (manufactured by Ishihara Sangyo Kaisha, Ltd., average secondary particle diameter: 7 μm) serving as electrode active materials, 5.0 parts by mass of acetylene black (manufactured by Denka Company Limited) serving as a conductive aid, and 45.0 parts by mass of $75Li_2S·25P_2S_5$ (molar ratio between $Li_2S$ and $P_2S_5$=75:25) serving as a solid electrolyte were mixed, and the mixture was molded by pressing treatment to produce a circular working electrode mixture layer having a diameter of 10 mm. Next, SUS foil, the working electrode mixture layer, a solid electrolyte layer ($75Li_2S·25P_2S_5$), an In—Li alloy, and another SUS foil were laminated in the stated order, and the laminate was subjected to press molding at a load of 20 kN, followed by its sealing in an all-solid battery evaluation cell (manufactured by Hohsen Corp., model: KP-SolidCell). Thus, an all-solid secondary battery J was produced.

[Comparative Example 13] Production of All-Solid Secondary Battery K

An all-solid secondary battery K was produced by the same procedure as that of Example 7 except that the electrode active materials in Example 7 were changed to only 50.0 parts by mass of the SPAN produced in Production Example 1.

[Comparative Example 14] Production of All-Solid Secondary Battery L

An all-solid secondary battery L was produced by the same procedure as that of Example 7 except that the electrode active materials in Example 7 were changed to only 50.0 parts by mass of a lithium-titanium oxide ($Li_4Ti_5O_{12}$) (manufactured by Ishihara Sangyo Kaisha, Ltd., average secondary particle diameter: 7 μm).

The following evaluations were performed by using the all-solid secondary batteries J to L produced in Example 7, Comparative Example 13, and Comparative Example 14.

(1) Rate Characteristic

Each of the all-solid secondary batteries was loaded into a thermostat at 60° C., and was subjected to a charge-discharge test a total of 8 times at a charge final voltage of 2.38 V and a discharge final voltage of 0.38 V as follows: the charge-discharge test was performed 5 consecutive times under the conditions of a charge rate of 0.05 C and a discharge rate of 0.05 C; and the charge-discharge test was performed 3 consecutive times under the conditions of a charge rate of 0.05 C and a discharge rate of 1.0 C. Thus, the discharge capacities of the battery were measured. The ratio of the eighth discharge capacity to the fifth discharge capacity was calculated as a rate characteristic (%). Those results are shown in Table 3.

TABLE 3

| | All-solid secondary battery | Rate characteristic [%] |
|---|---|---|
| Example 7 | All-solid secondary battery J | 73 |
| Comparative Example 13 | All-solid secondary battery K | 60 |
| Comparative Example 14 | All-solid secondary battery L | 67 |

EXPLANATION OF SIGNS 1 positive electrode
1a positive electrode collector
2 negative electrode
2a negative electrode collector
3 nonaqueous electrolyte
4 positive electrode case
5 negative electrode case
6 gasket
7 separator
10 coin-type lithium ion secondary battery
10' cylindrical lithium ion secondary battery
11 negative electrode
12 negative electrode collector
13 positive electrode
14 positive electrode collector
15 nonaqueous electrolyte
16 separator
17 positive electrode terminal
18 negative electrode terminal
19 negative electrode plate
20 negative electrode lead
21 positive electrode plate
22 positive electrode lead
23 case
24 insulating plate
25 gasket
26 safety valve
27 PTC element
28 laminated lithium ion secondary battery
29 electrode group
30 case-side laminated film
31 cap-side laminated film

The invention claimed is:

1. An electrode, comprising:
a collector; and
an active material layer formed on the collector, wherein the active material layer contains sulfur-modified polyacrylonitrile and a lithium-titanium oxide,
wherein an average secondary particle diameter of the sulfur-modified polyacrylonitrile is larger than an average secondary particle diameter of the lithium-titanium oxide,
wherein a content of the sulfur-modified polyacrylonitrile in the active material layer is from 5 mass % to 85 mass %, and a content of the lithium-titanium oxide in the active material layer is from 5 mass % to 85 mass %,
wherein the average secondary particle diameter of the sulfur-modified polyacrylonitrile is from 0.1 μm to 50 μm,
wherein the average secondary particle diameter of the lithium-titanium oxide is from 0.05 μm to 30 μm, and
wherein a secondary particle used for measuring each respective average secondary particle diameter is an aggregate of a corresponding primary particle.

2. A lithium ion secondary battery, comprising:
a positive electrode;
a negative electrode; and
a lithium salt-containing nonaqueous electrolyte,
wherein the positive electrode or the negative electrode is the electrode of claim 1.

3. The lithium ion secondary battery according to claim 2, wherein the lithium salt-containing nonaqueous electrolyte is a liquid nonaqueous electrolyte, a polymer gel-like nonaqueous electrolyte, a polymer nonaqueous electrolyte, a complex hydride-based solid electrolyte, or an inorganic solid electrolyte.

4. The lithium ion secondary battery according to claim 2, wherein the lithium salt-containing nonaqueous electrolyte is a liquid nonaqueous electrolyte, and the liquid nonaqueous electrolyte contains a cyclic carbonate compound.

5. The lithium ion secondary battery according to claim 4, wherein the liquid nonaqueous electrolyte further contains a chain carbonate compound.

6. The lithium ion secondary battery according to claim 2, wherein the lithium salt-containing nonaqueous electrolyte is an inorganic solid electrolyte, and the inorganic solid electrolyte is a sulfide-based solid electrolyte or an oxide-based solid electrolyte.

* * * * *